US009651930B2

(12) United States Patent
Nakatani et al.

(10) Patent No.: US 9,651,930 B2
(45) Date of Patent: May 16, 2017

(54) REMOTE CONTROLLING METHOD, COMMUNICATION DEVICE, AND COMPUTER-READABLE STORAGE MEDIUM RECORDED WITH COMPUTER PROGRAM FOR PERFORMING REMOTE CONTROL

(71) Applicant: Panasonic Intellectual Property Management Co., Ltd., Osaka-shi, Osaka (JP)

(72) Inventors: Naofumi Nakatani, Shiga (JP); Satoshi Tsujimura, Hyogo (JP); Kazunori Kurimoto, Hyogo (JP); Hiromi Toyota, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 328 days.

(21) Appl. No.: 14/515,269

(22) Filed: Oct. 15, 2014

(65) Prior Publication Data
US 2015/0039104 A1 Feb. 5, 2015

Related U.S. Application Data

(63) Continuation-in-part of application No. 14/380,644, filed as application No. PCT/JP2012/007818 on Dec. 6, 2012, now abandoned.

(30) Foreign Application Priority Data

Feb. 28, 2012 (JP) ................................ 2012-041873

(51) Int. Cl.
*G05B 15/02* (2006.01)
*H04W 88/02* (2009.01)
(Continued)

(52) U.S. Cl.
CPC ...... *G05B 19/0426* (2013.01); *H04L 12/2818* (2013.01); *H04L 12/2825* (2013.01);
(Continued)

(58) Field of Classification Search
CPC ...... G05B 19/0426; G05B 2219/36552; G05B 2219/23043; G05B 2219/23406;
(Continued)

(56) References Cited

U.S. PATENT DOCUMENTS 5,165,465 A * 11/1992 Kenet .................. G08B 19/005
165/11.1
2003/0078966 A1* 4/2003 Kinjo .................... G06F 3/1423
709/203
(Continued)

FOREIGN PATENT DOCUMENTS

CN       1872597 A     12/2006
CN     101010226 A      8/2007
(Continued)

OTHER PUBLICATIONS

Office Action in corresponding U.S. Appl. No. 14/380,644, dated Nov. 17, 2015, 10 pages.
(Continued)

*Primary Examiner* — Ramesh Patel
(74) *Attorney, Agent, or Firm* — Brinks, Gilson & Lione

(57) ABSTRACT

A mobile device is provided with a communication unit which performs communication via wireless communication, a display unit, and a display control unit which controls the display unit to display a setting input screen for allowing the user to input setting of a household electrical device. The communication unit transmits a request signal for checking whether there is a person in the vicinity of the household electrical device before the setting input screen is displayed by the display control unit. The display control unit controls the display unit to display a setting input disable screen indicating that setting of the household electrical device is not received without causing the display unit to display the setting input screen when there is a person in the vicinity of the household electrical device.

10 Claims, 12 Drawing Sheets

(51) Int. Cl.
*G05B 19/042* (2006.01)
*H04L 29/08* (2006.01)
*H04M 1/725* (2006.01)
*H04L 12/28* (2006.01)

(52) U.S. Cl.
CPC ...... *H04L 67/125* (2013.01); *H04M 1/72533* (2013.01); *G05B 2219/23043* (2013.01); *G05B 2219/23406* (2013.01); *G05B 2219/2613* (2013.01); *G05B 2219/36552* (2013.01)

(58) Field of Classification Search
CPC ........ G05B 2219/2613; H04L 12/2818; H04L 12/2825; H04L 67/125; H04M 1/72533
See application file for complete search history.

(56) References Cited

U.S. PATENT DOCUMENTS

| | | | |
|---|---|---|---|
| 2008/0065274 A1 | 3/2008 | Taki et al. | |
| 2008/0071429 A1 | 3/2008 | Kraimer et al. | |
| 2011/0069940 A1* | 3/2011 | Shimy | G11B 27/105 386/296 |
| 2011/0239260 A1* | 9/2011 | Konishi | H04L 12/66 725/109 |
| 2012/0282913 A1 | 11/2012 | Kaindl et al. | |
| 2012/0316693 A1* | 12/2012 | Ogawa | H02J 3/14 700/295 |

FOREIGN PATENT DOCUMENTS

| | | |
|---|---|---|
| CN | 101517622 A | 8/2009 |
| JP | 2003-120984 A | 4/2003 |
| JP | 2004-186738 A | 7/2004 |
| JP | 2008-042262 A | 2/2008 |
| JP | 2010-034957 A | 2/2010 |
| WO | WO 2011/091776 A1 | 8/2011 |

OTHER PUBLICATIONS

Office Action, and English language translation thereof, in corresponding Chinese Application No. 201280070647.0, dated Dec. 18, 2015, 8 pages.

International Search Report in corresponding International Application No. PCT/JP2012/007818, dated Mar. 5, 2013, 2 pages.

* cited by examiner

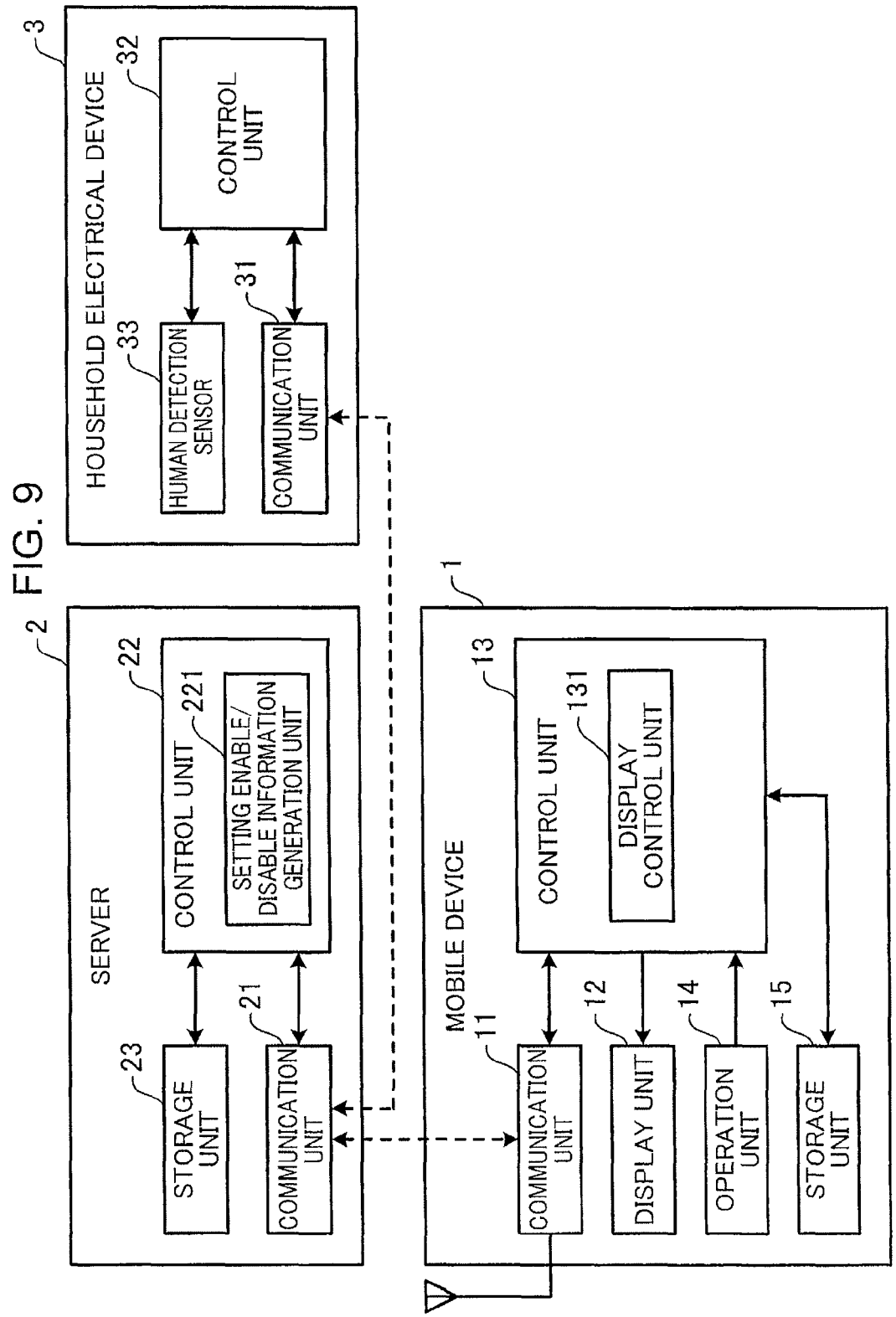

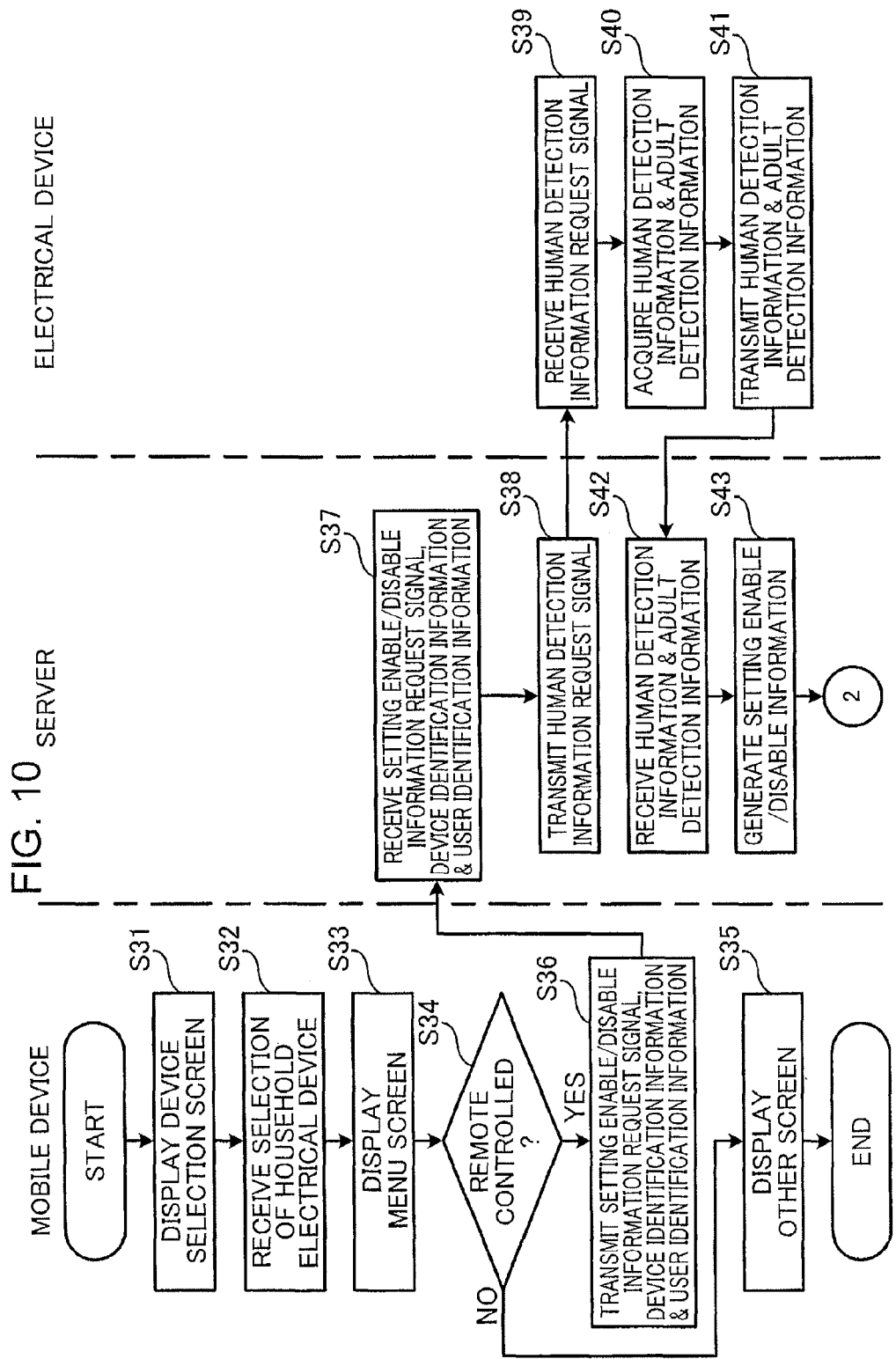

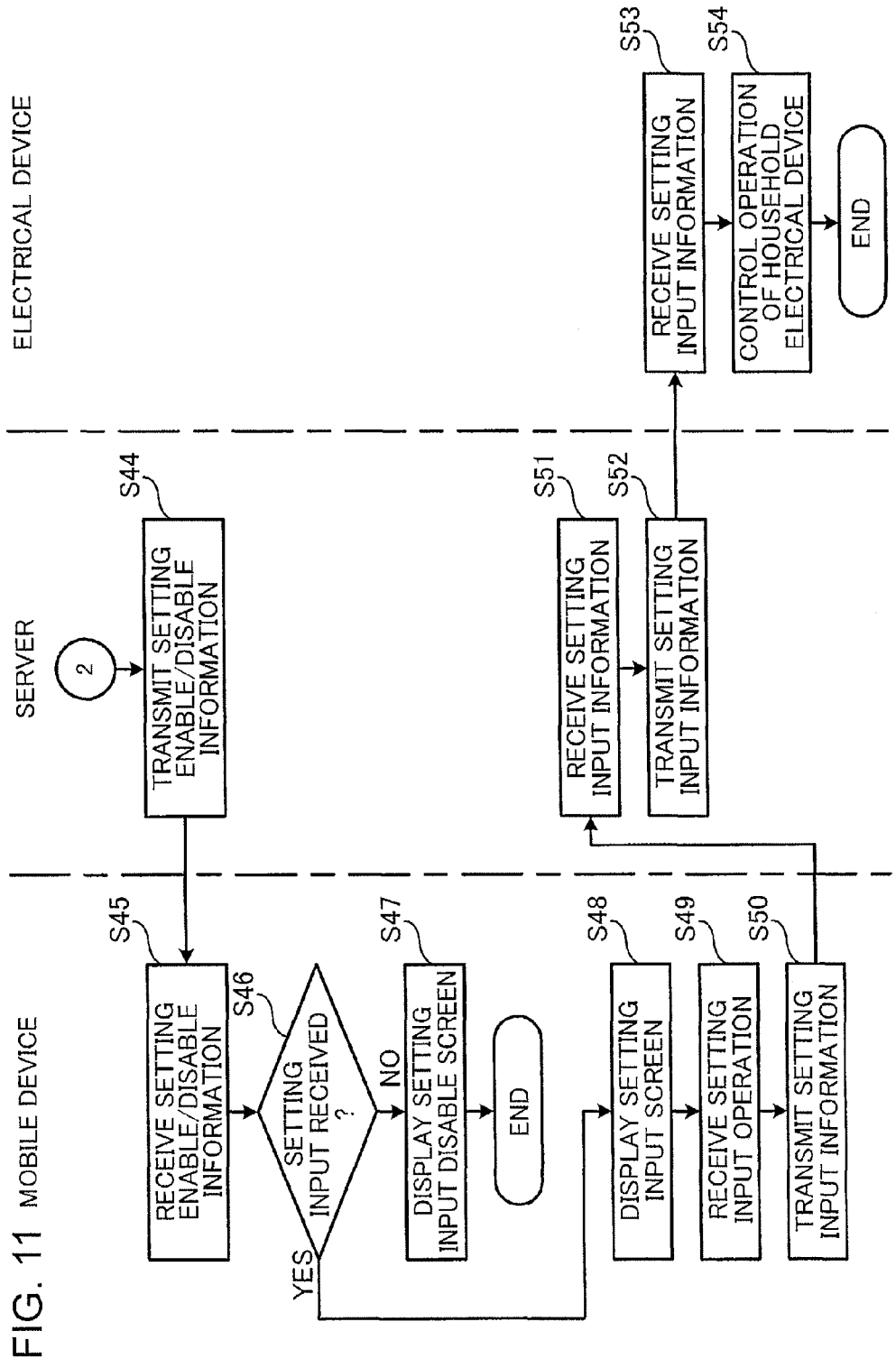

FIG. 12

| DEVICE IDENTIFICATION INFORMATION | USER IDENTIFICATION INFORMATION | RESTRICTION INFORMATION |
|---|---|---|
| $ID_A$ | $ID_1, ID_2$ | HUMAN DETECTION INVALIDATION |
| | $ID_3, ID_4, ID_5$ | HUMAN DETECTION VALIDATION |
| | $ID_3, ID_4$ | HUMAN DETECTION VALIDATION (CHILD) HUMAN DETECTION INVALIDATION (ADULT) |
| $ID_B$ | $ID_1$ | HUMAN DETECTION INVALIDATION |
| | $ID_2, ID_3, ID_4, ID_5$ | HUMAN DETECTION VALIDATION |
| | $ID_5$ | HUMAN DETECTION VALIDATION (CHILD) HUMAN DETECTION INVALIDATION (ADULT) |

REMOTE CONTROLLING METHOD, COMMUNICATION DEVICE, AND COMPUTER-READABLE STORAGE MEDIUM RECORDED WITH COMPUTER PROGRAM FOR PERFORMING REMOTE CONTROL

RELATED APPLICATIONS

This application is a continuation-in-part application of U.S. patent application Ser. No. 14/380,644 filed on Aug. 22, 2014 (now abandoned), which is a 371 application of PCT/JP2012/007818 having an international filing date of Dec. 6, 2012, which claims priority to JP2012-041873 filed on Feb. 28, 2012, the entire contents of which are incorporated herein by reference.

TECHNICAL FIELD

The present invention relates to a remote controlling method and a communication device for remote controlling an electrical device, and a computer-readable storage medium recorded with a computer program for performing the remote control.

BACKGROUND ART

Conventionally, there has been developed a mobile terminal configured to remote controlling household electrical devices disposed in a house from the outside of the house. A screen for receiving setting input is displayed in the mobile terminal. In response to setting input by the user, a household electrical device is remote controlled. However, when the household electrical device is remote controlled by the mobile terminal from the outside of the house, regardless that there is a person using the household electrical device in the house, the person using the household electrical device may feel annoyed.

In view of the above, for instance, patent literature 1 discloses a configuration relating to remote control of an air conditioner, in which an operation input from a remote controller is invalidated when a person is detected by a human detection sensor, and the air conditioner is controlled and operated based on an operation input in the house. The above configuration prevents a drawback such that the air conditioner may be remote controlled regardless that a person resides in the room where the air conditioner is installed.

However, in patent literature 1, the user of the remote controller on the outside of the house is only allowed to know whether there is a person in the vicinity of the air conditioner after transmitting a remote control input command. Accordingly, the user of the remote controller on the outside of the house cannot know whether there is a person in the room where the air conditioner is installed at the time of inputting setting for remote controlling the air conditioner. This may make a user's operation of input setting useless.

Further, transmitting a remote control input command from the remote controller to the air conditioner in a state that there is a person in the room where the air conditioner is installed may increase communications traffic on the network.

CITATION LIST

Patent Literature

Patent literature 1: Japanese Unexamined Patent Publication No. 2003-120984

SUMMARY OF THE INVENTION

In view of the above, an object of the invention is to provide a remote controlling method, a communication device, and a computer-readable storage medium recorded with a computer program for performing remote control that enable to enhance user's operability.

A communication system according to an aspect of the invention is provided with an electrical device, a communication device which remote controls the electrical device, a server communicatively connected to the electrical device and to the communication device, and a human detection sensor which detects whether there is a person in the vicinity of the electrical device. The communication device includes a first communication unit which communicates with the server via wireless communication, a display unit, and a display control unit which controls the display unit to display a setting input screen for allowing a user to input setting of the electrical device. The server includes a second communication unit which communicates with the communication device and with the electrical device. The electrical device includes a third communication unit which communicates with the server. The first communication unit is configured to transmit to the server a request signal for checking whether there is a person in the vicinity of the electrical device before the setting input screen is displayed by the display control unit. The second communication unit is configured to receive the request signal transmitted by the first communication unit, and to transmit the received request signal to the electrical device. The third communication unit is configured to receive the request signal transmitted by the second communication unit, and to acquire human detection information indicating whether there is a person in the vicinity of the electrical device from the human detection sensor for transmission to the server. The display control unit is configured to control the display unit to display a setting input disable screen indicating that setting of the electrical device is not received without causing the display unit to display the setting input screen when there is a person in the vicinity of the electrical device.

According to the above configuration, the first communication unit of the communication device communicates with the server via wireless communication. The display control unit of the communication device controls the display unit to display a setting input screen for allowing the user to input setting of the electrical device. The second communication unit of the server communicates with the communication device and with the electrical device. The third communication unit of the electrical device communicates with the server. The first communication unit transmits to the server a request signal for checking whether there is a person in the vicinity of the electrical device before the setting input screen is displayed by the display control unit. The second communication unit receives the request signal transmitted by the first communication unit, and transmits the received request signal to the electrical device. The third communication unit receives the request signal transmitted by the second communication unit, and acquires human detection information indicating whether there is a person in the vicinity of the electrical device from the human detection sensor for transmission to the server. The display control unit controls the display unit to display a setting input disable screen indicating that setting of the electrical device is not received without causing the display unit to display the setting input screen when there is a person in the vicinity of the electrical device.

According to the invention, a request signal for checking whether there is a person in the vicinity of the electrical device is transmitted before a setting input screen is displayed. When there is a person in the vicinity of the electrical device, a setting input disable screen indicating that setting of the electrical device is not received is displayed on the display unit without displaying the setting input screen on the display unit. This allows for the user to know that setting of the electrical device is not received because there is a person in the vicinity of the electrical device before the user inputs setting of the electrical device. This is advantageous in enhancing the user's operability. Further, when there is a person in the vicinity of the electrical device, setting input information for inputting setting of the electrical device is not transmitted from the communication device to the electrical device. This is advantageous in suppressing an increase in communications traffic on the network.

These and other objects, features and advantages of the present invention will become more apparent upon reading the following detailed description along with the accompanying drawings.

BRIEF DESCRIPTION OF THE DRAWINGS

FIG. 9 is a diagram illustrating a detailed configuration of a communication system according to the second embodiment of the invention;

FIG. 10 is a first half flowchart for describing an operation to be performed by the communication system according to the second embodiment of the invention;

FIG. 11 is a second half flowchart for describing the operation to be performed by the communication system according to the second embodiment of the invention; and FIG. 12 is a diagram illustrating an example of a restriction information table stored in a storage unit of a server in the second embodiment of the invention.

DESCRIPTION OF EMBODIMENTS

Figure 1:
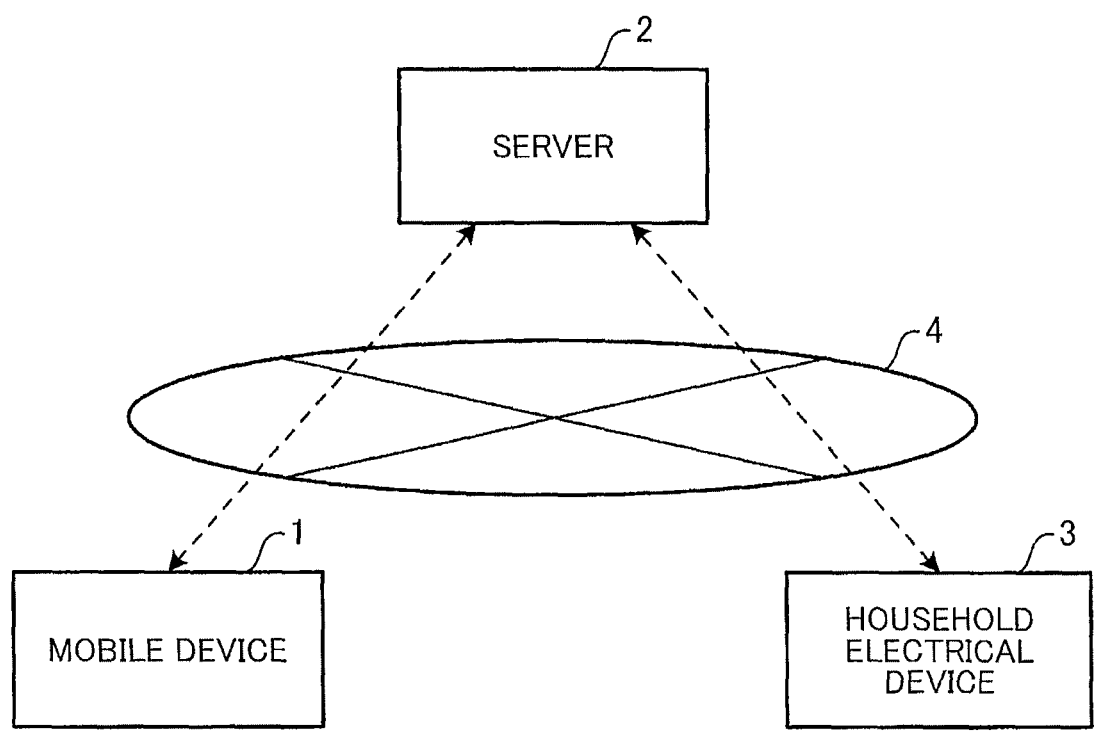
FIG. 1 is a diagram illustrating an overall configuration of a communication system according to the first embodiment of the invention.

In the following, embodiments of the invention are described referring to the drawings. The following embodiments are examples embodying the invention, and do not limit the technical range of the invention.

First Embodiment

FIG. 1 is a diagram illustrating an overall configuration of a communication system according to the first embodiment of the invention. The communication system illustrated in FIG. 1 is provided with a mobile device 1, a server 2, and a household electrical device 3.

The mobile device 1 is constituted of a communication device such as a mobile phone, and is communicatively connected to the server 2 via a network 4. The mobile device 1 remote controls the household electrical device 3.

The household electrical device 3 is constituted of e.g. an air conditioner, a refrigerator-freezer, a rice cooker, a microwave oven, or a washing dryer; and is communicatively connected to the server 2 via the network 4. The household electrical device 3 may be an electrical device to be used in an indoor environment such as in a house or building or in an outdoor environment, the household electrical device 3 including housing equipment and sensors for measuring and detecting the living environment. As far as the household electrical device is remote controllable, any electrical device may be used.

The server 2 is constituted of a well-known server computer, and is communicatively connected to the mobile device 1 and to the household electrical device 3 via the network 4.

Figure 2:
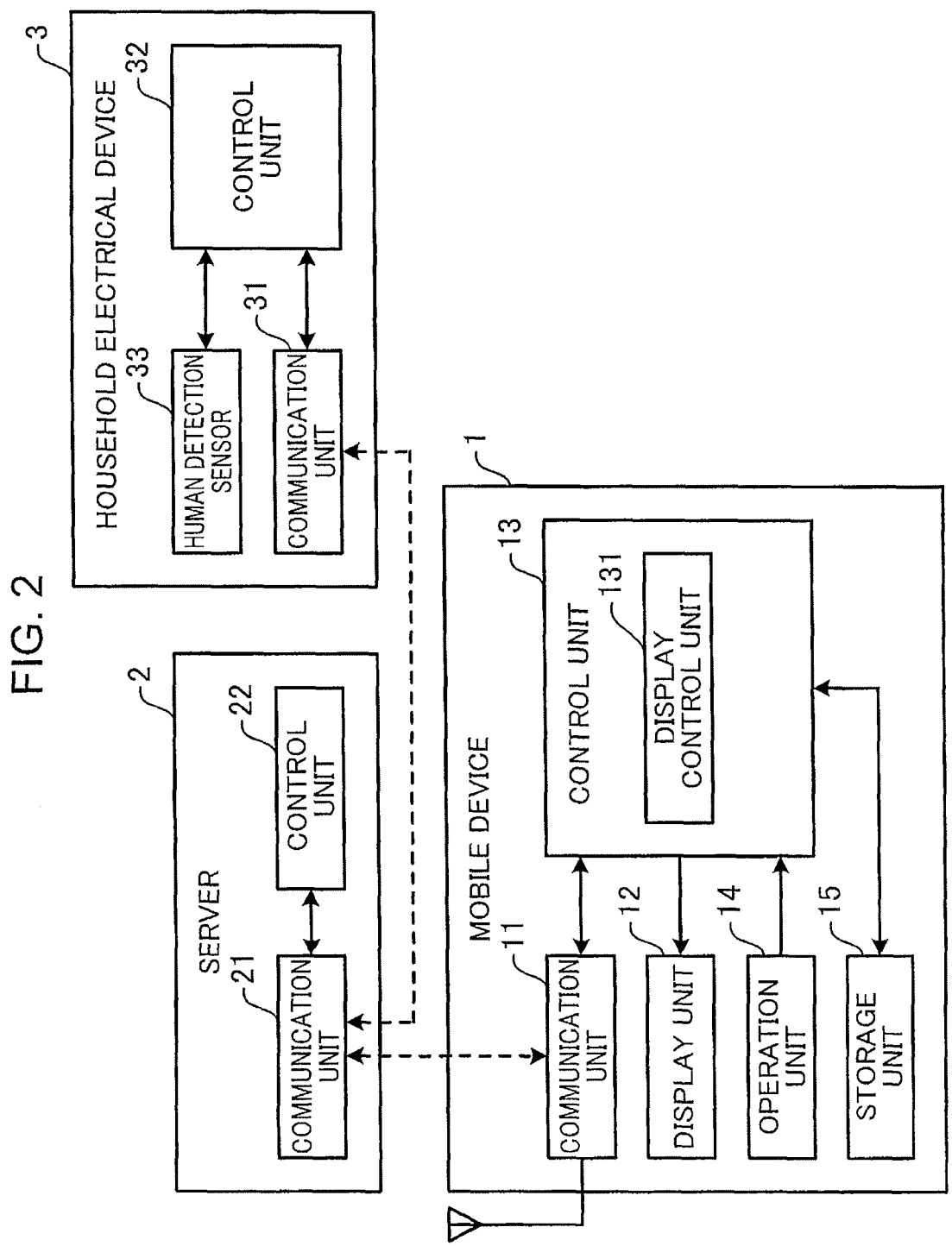
FIG. 2 is a diagram illustrating a detailed configuration of the communication system according to the first embodiment of the invention.

FIG. 2 is a diagram illustrating a detailed configuration of the communication system according to the first embodiment of the invention. The mobile device 1 is provided with a communication unit 11, a display unit 12, a control unit 13, an operation unit 14, and a storage unit 15.

The communication unit 11 is configured to communicate with the server 2 via the network 4. The network 4 is e.g. a mobile communication network or the Internet. The communication unit 11 may communicate with the network 4 via a local area network or the like. The communication unit 11 is configured to communicate via wireless communication.

The display unit 12 is constituted of e.g. a liquid crystal display device, and is configured to display various display screens. The display unit 12 is configured to display a device selection screen including items for selecting the household electrical device 3 as an object for remote control, a menu screen including items for shifting to a setting input screen, which is used for inputting setting of the household electrical device 3, a setting input screen for allowing the user to input setting of the household electrical device 3, and a setting input disable screen indicating that setting of the household electric device 3 is not received.

The control unit 13 is constituted of e.g. a CPU (Central Processing Unit). The control unit 13 is configured to control the entirety of the mobile device 1, and is provided with a display control unit 131. The display control unit 131 is configured to control the display unit 12 to display the device selection screen, the menu screen, the setting input screen, or the setting input disable screen. The display control unit 131 is configured to switch the display screen to be displayed on the display unit 12 between the device selection screen, the menu screen, the setting input screen, and the setting input disable screen. The device selection screen, the menu screen, the setting input screen, and the setting input disable screen will be described later.

The operation unit 14 is constituted of e.g. a touch panel or operation keys, and is configured to receive a user's input operation.

The storage unit 15 is configured to store the device selection screen, the menu screen, the setting input screen, and the setting input disable screen to be displayed on the display unit 12. The storage unit 15 is configured to store the menu screen and the setting input screen in correspondence to the household electrical device 3. The display control unit 131 is configured to read the device selection screen, the menu screen, the setting input screen, or the setting input disable screen from the storage unit 15, and to control the display unit 12 to display the read screen.

The communication unit 11 is configured to transmit a request signal for checking whether there is a person in the vicinity of the household electrical device 3 before the setting input screen is displayed by the display control unit 131. Further, when there is a person in the vicinity of the household electrical device 3, the display control unit 131 controls the display unit 12 to display the setting input disable screen, without causing the display unit 12 to display the setting input screen. Further, the communication unit 11 is configured to transmit a request signal when the display screen is switched from the menu screen to the setting input screen by the display control unit 131.

The display control unit 131 is configured to control the display unit 12 to display the menu screen, and to control the display unit 12 to display the setting input disable screen before the setting input screen is displayed on the display unit 12 when there is a person in the vicinity of the household electrical device 3.

The communication unit 11 is configured to receive human detection information indicating whether there is a person in the vicinity of the household electrical device 3 before the setting input screen is displayed by the display control unit 131. When the communication unit 11 receives human detection information indicating the presence of a person, the display control unit 131 controls the display unit 12 to display the setting input disable screen, without causing the display unit 12 to display the setting input screen.

The server 2 is provided with a communication unit 21 and a control unit 22.

The communication unit 21 is configured to communicate with the mobile device 1 and with the household electrical device 3 via the network 4. The control unit 22 is constituted of e.g. a CPU, and is configured to control the operation of the communication unit 21.

The communication unit 21 is configured to receive a request signal transmitted from the communication unit 11, and to transmit the received request signal to the household electrical device 3.

The household electrical device 3 is provided with a communication unit 31, a control unit 32, and a human detection sensor 33.

The communication unit 31 is configured to communicate with the server 2 via the network 4. The control unit 32 is constituted of e.g. a CPU, and is configured to control the operation of the communication unit 31, and to control the operation of the human detection sensor 33 in accordance with information received via the communication unit 31.

The human detection sensor 33 is configured to detect whether there is a person in the vicinity of the household electrical device 3. Specifically, the human detection sensor 33 is configured to detect whether there is a person in the room where the household electrical device 3 is disposed. The human detection sensor 33 is constituted of e.g. a camera, and is configured to detect a person by recognizing the person from an image photographed by the camera.

The human detection sensor 33 may be configured to detect a person by detecting a temperature change from an image photographed by the camera. Further, the human detection sensor 33 may be configured to detect a person by detecting on/off of the power supply of the household electrical device 3. Furthermore, the human detection sensor 33 may be configured to detect a person with use of at least one of infrared light, ultrasonic wave, and visible light.

Further, in the embodiment, the human detection sensor 33 is provided in the household electrical device 3. The invention is not specifically limited to the above. As far as the human detection sensor 33 is disposed in the room where the household electrical device 3 at such a position as to detect whether there is a person in the vicinity of the household electrical device 3, it is not necessary to dispose the human detection sensor 33 in the household electrical device 3.

The communication unit 31 is configured to receive a request signal transmitted from the communication unit 21, and to acquire human detection information indicating whether there is a person in the vicinity of the household electrical device 3 from the human detection sensor 33 for transmission to the server 2. The communication unit 21 is configured to receive human detection information transmitted by the communication unit 31, and to transmit the received human detection information to the communication unit 11. Further, the communication unit 11 is configured to receive human detection information transmitted by the communication unit 21.

In the embodiment, the mobile device 1 is configured such that the storage unit 15 stores the device selection screen, the menu screen, the setting input screen, and the setting input disable screen. The invention is not specifically limited to the above. The device selection screen, the menu screen, the setting input screen, and the setting input disable screen may be acquired from the server 2. For instance, the server 2 is configured to store the device selection screen, the menu screen, the setting input screen, and the setting input disable screen, and to transmit the device selection screen, the menu screen, the setting input screen, or the setting input disable screen to the mobile device 1 in response to a request from the mobile device 1. The mobile device 1 is configured to display the received device selection screen, menu screen, setting input screen, or setting input disable screen on the display unit 12.

Further, in the embodiment, the mobile device 1 corresponds to an example of a communication device, the server 2 corresponds to an example of a server, the household electrical device 3 corresponds to an example of an electrical device, the human detection sensor 33 corresponds to an example of a human detection sensor, the communication unit 11 corresponds to an example of a communication unit and a first communication unit, the display unit 12 corresponds to an example of a display unit, the display control unit 131 corresponds to an example of a display control unit, the communication unit 21 corresponds to an example of a second communication unit, and the communication unit 31 corresponds to an example of a third communication unit.

Figure 3:
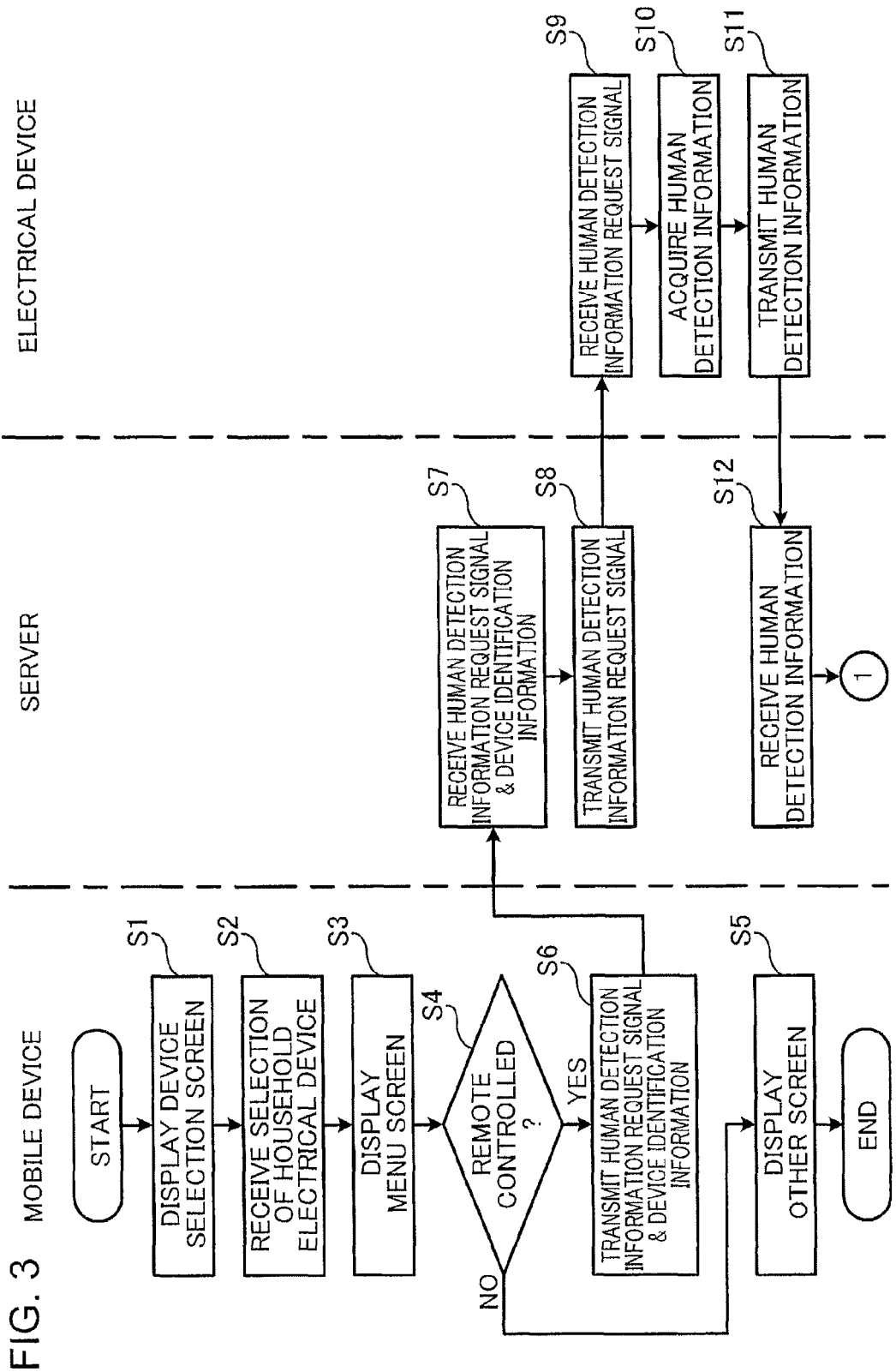
FIG. 3 is a first half flowchart for describing an operation to be performed by the communication system according to the first embodiment of the invention.
Figure 4:
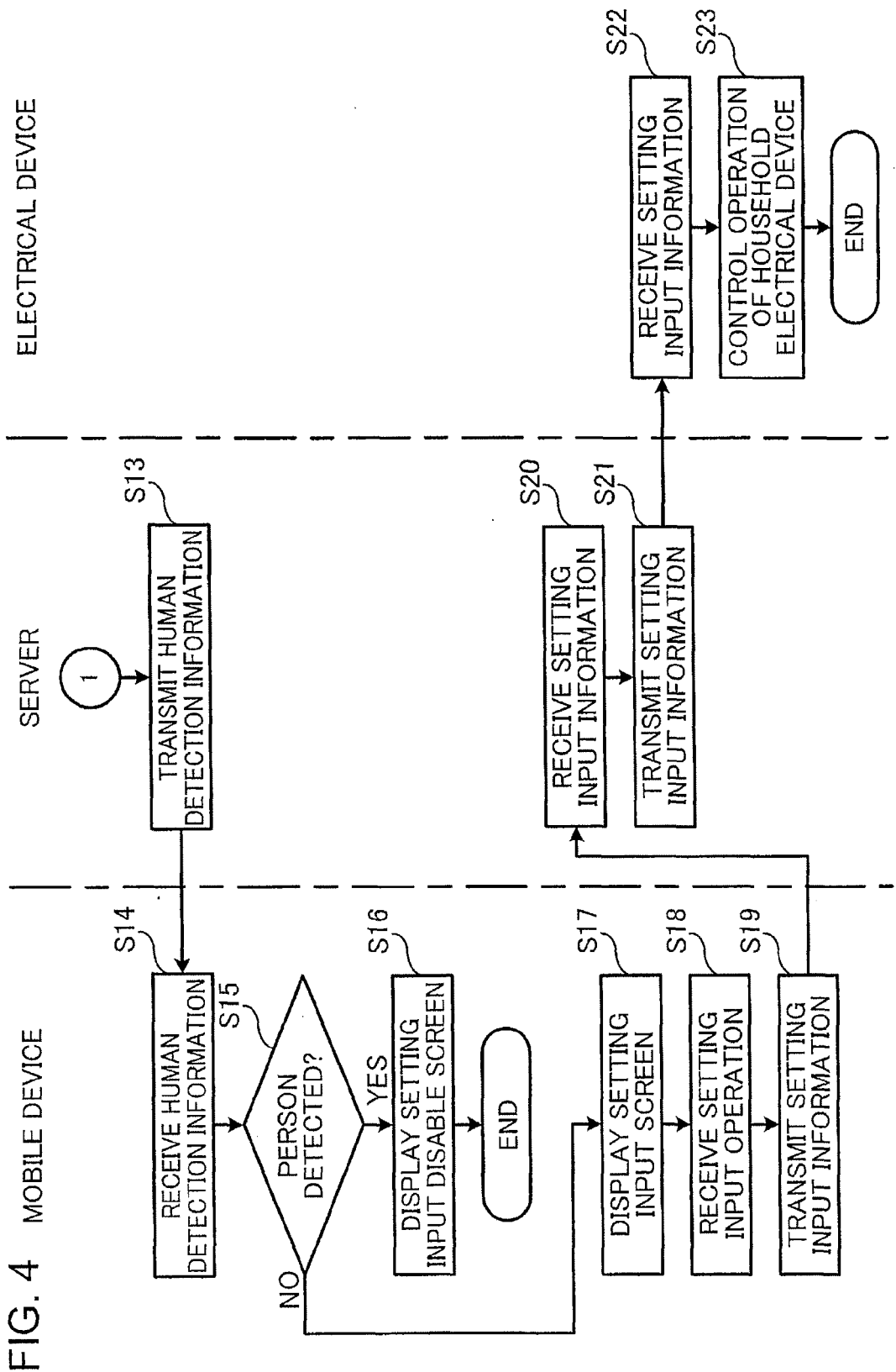
FIG. 4 is a second half flowchart for describing the operation to be performed by the communication system according to the first embodiment of the invention.

Next, an operation to be performed by the communication system according to the first embodiment of the invention is described. FIG. 3 and FIG. 4 are a flowchart for describing an operation to be performed by the communication system according to the first embodiment of the invention.

First of all, in Step S1, the display control unit 131 in the mobile device 1 controls the display unit 12 to display a device selection screen including items for selecting the household electrical device 3 as an object for remote control.

Concurrently, the operation unit 14 receives a command of activating an application for remote controlling the household electrical device. The control unit 13 activates the application based on the received activation command.

The display control unit 131 controls the display unit 12 to display a device selection screen for selecting a household electrical device as an object for remote control. The device selection screen is stored in the storage unit 15, and is generated based on a holding device list on the household electrical devices owned by the user. The holding device list is, for instance, stored in the storage unit 15. For instance, the user may input the name, the type, and the device ID of a household electrical device, whereby the input data is registered in the holding device list stored in the storage unit 15. The holding device list may be stored in the server 2. The device ID is a unique identification number capable of promptly specifying which device belongs to which user, even in a case that devices of the same type are managed in the server. The display unit 12 is controlled to display the device selection screen by the display control unit 131.

In the embodiment, the device selection screen is stored in the storage unit 15. The invention is not specifically limited to the above. The device selection screen may be stored in the server 2. In the above case, the communication unit 11 transmits a device selection screen request for requesting the device selection screen to the server 2. The device selection screen request includes mobile device identification information for identifying the mobile device 1. Subsequently, the communication unit 21 in the server 2 receives the device selection screen request transmitted by the mobile device 1. Subsequently, the control unit 22 in the server 2 extracts household electrical device information (such as the name, the type, and the device ID of a household electrical device) corresponding to the mobile device identification information included on the device selection screen request from a holding device management database; and generates the extracted household electrical device information as the holding device list. In the holding device management database, the household electrical device information and the mobile device identification information are stored in association with each other. Subsequently, the communication unit 21 in the server 2 generates a device selection screen for selecting a household electrical device as an object for remote control, based on the holding device list generated by the control unit 22. Subsequently, the communication unit 21 in the server 2 transmits the generated device selection screen to the mobile device 1. Subsequently, the communication unit 11 in the mobile device 1 receives the device selection screen transmitted by the server 2. Subsequently, the display control unit 131 controls the display unit 12 to display the device selection screen received by the communication unit 11.

Figure 5:
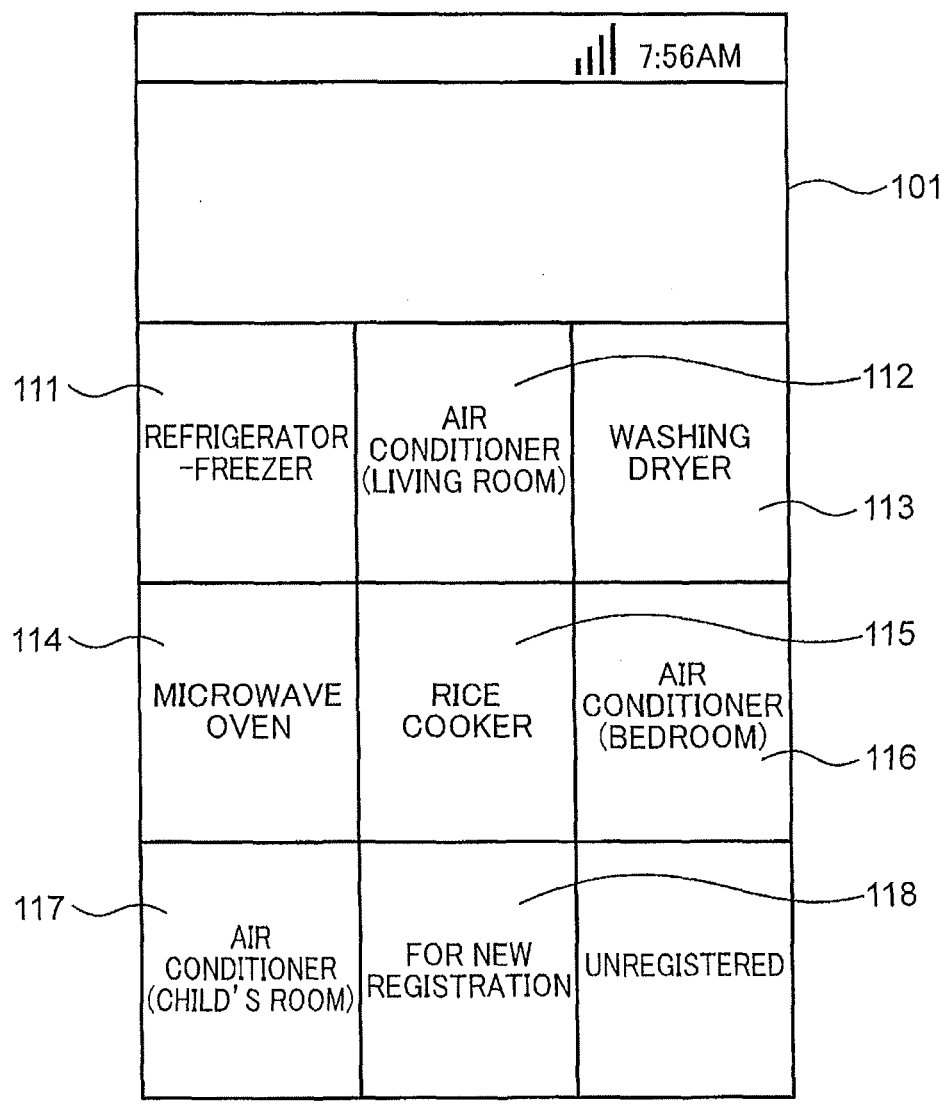
FIG. 5 is a diagram illustrating an example of a device selection screen in the first embodiment of the invention.

FIG. 5 is a diagram illustrating an example of the device selection screen in the first embodiment of the invention. As illustrated in FIG. 5, on a device selection screen 101, there are displayed selection items 111 to 118 for selecting a household electrical device, which is remote controllable by the mobile device 1.

For instance, the device selection screen 101 includes a selection item 111 for selecting a refrigerator-freezer, a selection item 112 for selecting an air conditioner disposed in the living room, a selection item 113 for selecting a washing dryer, a selection item 114 for selecting a microwave oven, a selection item 115 for selecting a rice cooker, a selection item 116 for selecting an air conditioner disposed in the bedroom, a selection item 117 for selecting an air conditioner disposed in the child's room, and a selection item 118 for registering a new household electrical device.

Subsequently, in Step S2, the operation unit 14 receives selection of a household electrical device to be remote controlled from among the household electrical devices displayed on the device selection screen. The user is allowed to select a household electrical device to be remote controlled from among the selection items 111 to 119 to be displayed on the display unit 12. The operation unit 14 receives a user's operation of selecting a household electrical device. When the display unit 12 is a touch panel, an intended selection item is selected from among the selection items 111 to 119 in response to user's touching the display screen. Further, when the display unit 12 is not a touch panel, an intended selection item is selected from among the selection items 111 to 119 in response to a user's operation of an operation member provided in the mobile device 1.

Subsequently, in Step S3, the display control unit 131 controls the display unit 12 to display a menu screen including items for shifting to a setting input screen for allowing the user to input setting of the household electrical device 3. The display control unit 131 controls the display unit 12 to display a menu screen corresponding to the selected household electrical device. The menu screen is stored in the storage unit 15 in association with the household electrical device. For instance, the storage unit 15 stores a menu screen corresponding to a refrigerator-freezer, and a menu screen corresponding to a washing dryer.

Figure 6:
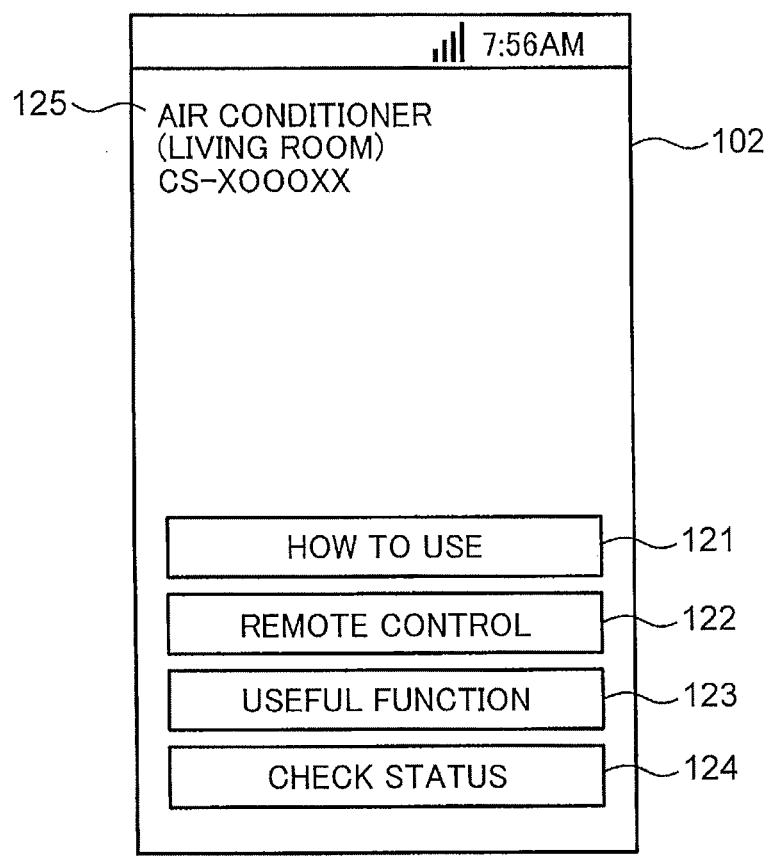
FIG. 6 is a diagram illustrating an example of a menu screen in the first embodiment of the invention.

FIG. 6 is a diagram illustrating an example of the menu screen in the first embodiment of the invention. As illustrated in FIG. 6, a menu screen 102 includes a selection item 121 for guiding the user as to how to use the household electrical device 3, a selection item 122 for shifting the display screen to a setting input screen for allowing the user to input setting of the household electrical device 3, a selection item 123 for describing the function of the household electrical device 3, and a selection item 124 for checking the status of the household electrical device 3.

The menu screen 102 illustrated in FIG. 6 is a screen to be displayed when the selection item 112 is selected on the device selection screen 101 illustrated in FIG. 5. Further, the selection item to be displayed on the menu screen 102 illustrated in FIG. 6 is an example. The invention is not limited to the above. Further, a name 125 of the household electrical device 3 selected by the user is displayed on the menu screen 102. In FIG. 6, the selected household electrical device is an air conditioner. Accordingly, the name 125 is indicated as "AIR CONDITIONER (LIVING ROOM)". The name 125 includes the serial number of the household electrical device along with the name of the household electrical device.

The operation unit 14 is configured to receive user's selection of the selection items 121 to 124 displayed on the menu screen. The user is allowed to select one of the selection items 121 to 124 to be displayed on the display unit 12. The operation unit 14 is configured to receive a user's selection operation. When the display unit 12 is a touch panel, an intended selection item is selected from among the selection items 121 to 124 in response to user's touching the display screen. Further, when the display unit 12 is not a touch panel, an intended selection item is selected from among the selection items 121 to 124 in response to a user's operation of an operation member provided in the mobile device 1.

When the household electrical device 3 is remote controlled, the user selects the selection item 122. The selection item 122 is an item for shifting the display screen to a setting input screen for allowing the user to input setting of the household electrical device 3.

Subsequently, in Step S4, the display control unit 131 judges whether the selection item 122 for shifting to the setting input screen for allowing the user to input setting of the household electrical device 3, namely, judges whether the household electrical device 3 is remote controlled. When it is judged that the household electrical device 3 is not remote controlled, namely, when a selection item other than the selection item 122 for shifting to the setting input screen for allowing the user to input setting of the household electrical device 3 is selected (NO in Step S4), in Step S5, the display control unit 131 displays a screen corresponding to the selection item selected by the user, other than the selection item 122.

In the embodiment, description about a screen to be displayed when the selection item 121, 123, 124 other than the selection item 122 is selected is omitted. Further, in the first embodiment, the display control unit 131 finishes the operation after the screen corresponding to the selection item 121, 123, 124 is displayed. The invention is not specifically limited to the above. The display screen may return to the menu screen 102 in response to a command from the operation unit 14.

On the other hand, when it is judged that the household electrical device 3 is remote controlled, namely, when the selection item 122 for shifting to the setting input screen for allowing the user to input setting of the household electrical device 3 is selected (YES in Step S4), in Step S6, the communication unit 11 transmits, to the server 2, a human detection information request signal for requesting human detection information indicating whether there is a person in the vicinity of the electrical device, and device identification information for identifying the selected household electrical device. The communication unit 11 reads the device identification information corresponding to the selected household electrical device from the storage unit 15 in transmitting a human detection information request signal, and transmits the read device identification information along with the human detection information request signal. Here, the communication unit 11 transmits the device identification information, but the communication unit 11 may transmit a code associated with a device identification information. In this case, the server 2 stores an association between the device identification information and the code.

Subsequently, in Step S7, the communication unit 21 in the server 2 receives the human detection information request signal and the device identification information transmitted by the communication unit 11. The server 2, in the case of receiving the code, reads the device identification information associated with the received code on the basis of the association between the device identification information and the code stored in the server 2.

Subsequently, in Step S8, the communication unit 21 transmits the received human detection information request signal to the household electrical device 3 to be specified by the received device identification information.

Subsequently, in Step S9, the communication unit 31 in the household electrical device 3 receives the human detection information request signal transmitted by the communication unit 21.

Subsequently, in Step S10, the human detection sensor 33 acquires human detection information indicating whether there is a person in the vicinity of the household electrical device 3. The human detection sensor 33 detects whether there is a person in the vicinity of the household electrical device 3 in response to receiving the human detection information request signal. The human detection sensor 33 may periodically detect at a predetermined time interval. In this case, the human detection sensor 33 outputs a latest detection result to the communication unit 31 in response to receiving the human detection information request signal. The human detection sensor 33 may periodically output a detection result to the communication unit 31 at a predetermined time interval.

Subsequently, in Step S11, the communication unit 31 transmits the human detection information acquired by the human detection sensor 33 to the server 2. The communication unit 31 may periodically transmit the human detection information to the server 2 at a predetermined time interval.

Subsequently, in Step S12, the communication unit 21 in the server 2 receives the human detection information transmitted by the communication unit 31.

Subsequently, in Step S13, the communication unit 21 transmits the received human detection information to the mobile device 1. The server 2, in the case of periodically receiving the human detection information, may omit Step S8 of transmitting the human detection information request signal.

Subsequently, in Step S14, the communication unit 11 in the mobile device 1 receives the human detection information transmitted by the communication unit 21.

Subsequently, in Step S15, the display control unit 131 judges whether the human detection sensor 33 has detected the presence of a person, namely, judges whether the communication unit 11 has received the human detection information indicating the presence of a person. When it is judged that the human detection sensor 33 has detected the presence of a person (YES in Step S15), in Step S16, the display control unit 131 controls the display unit 12 to display a setting input disable screen indicating that setting of the household electrical device 3 is not received without causing the display unit 12 to display a setting input screen.

Figure 7:
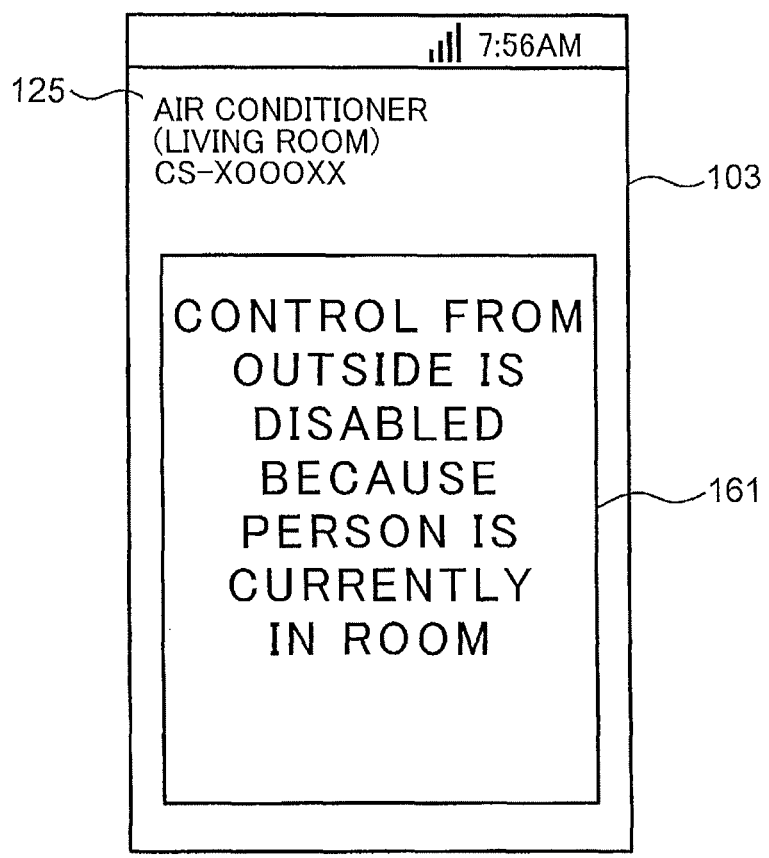
FIG. 7 is a diagram illustrating an example of a setting input disable screen in the first embodiment of the invention.

FIG. 7 is a diagram illustrating an example of the setting input disable screen in the first embodiment of the invention. As illustrated in FIG. 7, on a setting input disable screen 103, there is displayed a message 161 for notifying the user that setting of the household electrical device 3 is not received because there is a person in the vicinity of the household electrical device 3. In FIG. 7, for instance, there is displayed the message 161 "CONTROL FROM OUTSIDE IS DISABLED BECAUSE PERSON IS CURRENTLY IN ROOM!". Further, a partial display of a setting input screen may be provided as long as the user can recognize that the displayed screen does not setting input screen. For instance, it may be appreciated to display a part of the setting input screen on the background of the message 161 shown in FIG. 7. In this case, the operation unit 14 is prohibited to receive setting input from the user. By shading the part of the setting input screen in grey, for instance, the user will easily recognize that input operation is not allowed.

On the other hand, when it is judged that the human detection sensor 33 has not detected the presence of a person (NO in Step S15), in Step S17, the display control unit 131 controls the display unit 12 to display a setting input screen.

Figure 8:
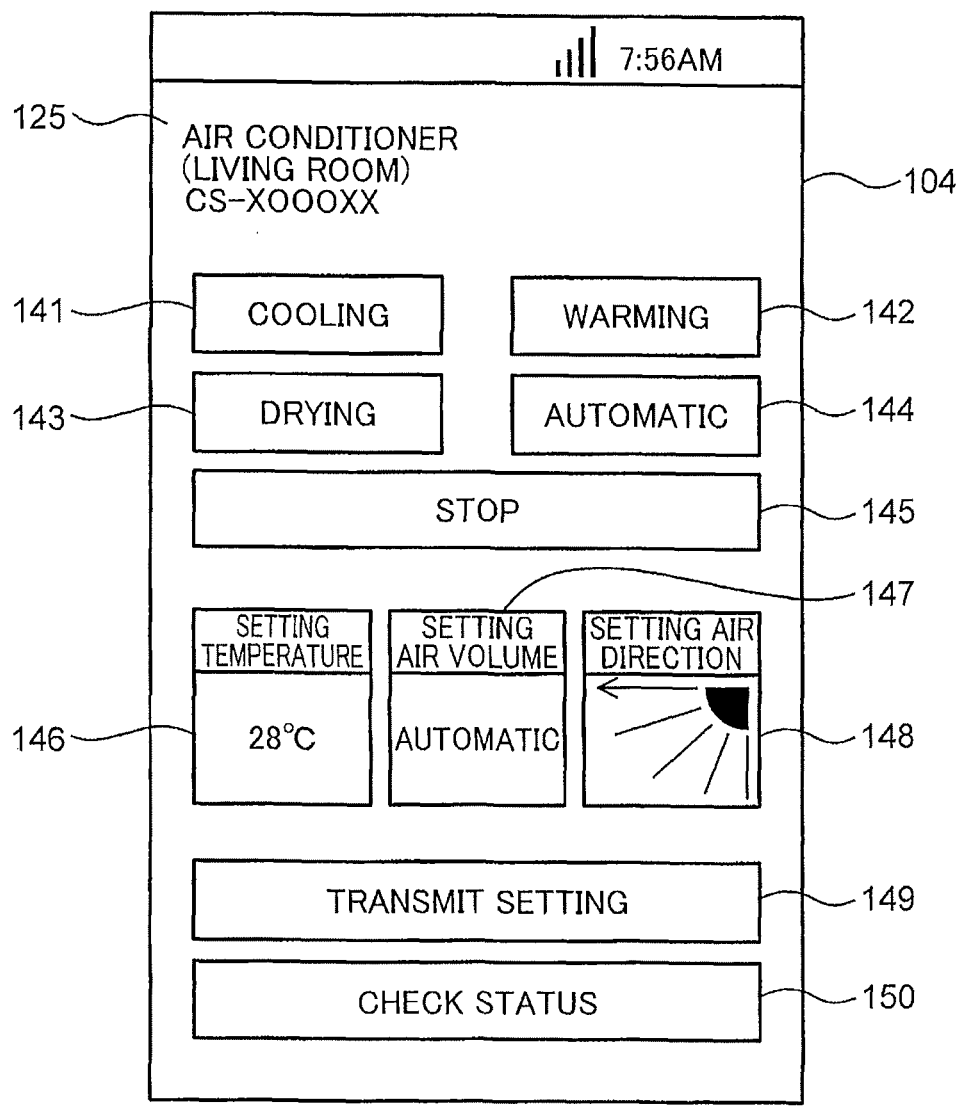
FIG. 8 is a diagram illustrating an example of a setting input screen in the first embodiment of the invention.

FIG. 8 is a diagram illustrating an example of the setting input screen in the first embodiment of the invention. A setting input screen 104 illustrated in FIG. 8 is a screen to be displayed when the selection item 112 is selected on the device selection screen 101 illustrated in FIG. 5, and the selection item 122 is selected on the menu screen 102 illustrated in FIG. 6.

On the setting input screen 104, there are displayed the name 125 of the household electrical device 3, a cooling button 141 for switching the air conditioner to a cooling operation, a warming button 142 for switching the air conditioner to a warming operation, a drying button 143 for switching the air conditioner to a drying operation, an automatic button 144 for switching the air conditioner to an automatic operation, a stop button 145 for stopping the operation of the air conditioner, a temperature setting button 146 for setting the temperature, an air volume setting button 147 for setting the air volume, an air direction setting button 148 for setting the air direction, a transmission button 149 for transmitting the set contents, and a status checking button 150 for checking the status of the household electrical device 3.

Subsequently, in Step S18, the operation unit 14 receives a user's input operation of setting the buttons 141 to 150. When the display unit 12 is a touch panel, an intended button is selected from among the buttons 141 to 150 in response to user's touching the display screen. Further, when the display unit 12 is not a touch panel, an intended button is selected from among the buttons 141 to 150 in response to a user's operation of an operation member provided in the mobile device 1.

When the user intends to switch the household electrical device 3 (air conditioner) to a cooling operation, the user selects the cooling button 141. When the user intends to switch the air conditioner to a warming operation, the user selects the warming button 142. When the user intends to switch the air conditioner to a drying operation, the user selects the drying button 143. When the user intends to switch the air conditioner to an automatic operation, the user selects the automatic button 144. When the user intends to stop the operation of the air conditioner, the user selects the stop button 145. Further, when the user intends to set the temperature, the user inputs an intended temperature via the temperature setting button 146. When the user intends to set the air volume, the user inputs an intended air volume via the air volume setting button 147. When the user intends to set the air direction, the user inputs an intended air direction via the air direction setting button 148.

Further, when the user is satisfied with the set contents, the user selects the transmission button 149. By performing the above operation, the set input contents are transmitted to the server 2. Further, when the user intends to check the current status of the household electrical device 3, the user selects the status checking button 150.

Subsequently, in Step S19, the communication unit 11 transmits, to the server 2, setting input information including the set input contents received by the operation unit 14.

Subsequently, in Step S20, the communication unit 21 in the server 2 receives the setting input information transmitted by the communication unit 11.

Subsequently, in Step S21, the communication unit 21 transmits the received setting input information to the household electrical device 3.

Subsequently, in Step S22, the communication unit 31 in the household electrical device 3 receives the setting input information transmitted by the communication unit 21. In the embodiment, the setting input information is transmitted from the mobile device 1 to the server 2, and from the server 2 to the household electrical device 3. The invention is not specifically limited to the above. The setting input information may be directly transmitted from the mobile device 1 to the household electrical device 3.

Subsequently, in Step S23, the control unit 32 controls the operation of the household electrical device 3 in accordance with the setting input information received by the communication unit 31.

As described above, a request signal for checking whether there is a person in the vicinity of the household electrical device 3 is transmitted before a setting input screen is displayed. When there is a person in the vicinity of the household electrical device 3, a setting input disable screen indicating that setting of the household electrical device 3 is not received is displayed on the display unit 12, without displaying a setting input screen on the display unit 12. This allows for the user to know that setting of the household electrical device 3 is not received because there is a person in the vicinity of the household electrical device 3 before the user inputs setting of the household electrical device 3. This is advantageous in enhancing the user's operability. Further, when there is a person in the vicinity of the household electrical device 3, setting input information for inputting setting of the household electrical device 3 is not transmitted from the mobile device 1 to the household electrical device 3. This is advantageous in suppressing an increase in communications traffic on the network.

Second Embodiment

In this section, a communication system according to the second embodiment is described. FIG. 9 is a diagram illustrating a detailed configuration of the communication system according to the second embodiment of the invention. The communication system according to the second embodiment is provided with a mobile device 1, a server 2, and a household electrical device 3. The overall configuration of the communication system according to the second embodiment is substantially the same as the overall configuration of the communication system according to the first embodiment illustrated in FIG. 1.

The mobile device 1 is provided with a communication unit 11, a display unit 12, a control unit 13, an operation unit 14, and a storage unit 15. The server 2 is provided with a communication unit 21, a control unit 22, and a storage unit 23. The household electrical device 3 is provided with a communication unit 31, a control unit 32 and a human detection sensor 33. In FIG. 9, the elements substantially the same as those in the communication system illustrated in FIG. 2 are indicated with the same reference signs, and description thereof is omitted. In the following, a configuration different from the configuration of the first embodiment is described.

The communication unit 11 in the mobile device 1 is configured to receive setting enable/disable information indicating that setting of the household electrical device 3 by the user is received when there is no person in the vicinity of the household electrical device 3, and indicating that setting of the household electrical device 3 by the user is not received when there is a person in the vicinity of the household electrical device 3 before a setting input screen is displayed by a display control unit 131.

The display control unit 131 is configured to control the display unit 12 to display a setting input disable screen indicating that setting of the household electrical device 3 is not received without causing the display unit 12 to display a setting input screen when the communication unit 11 receives setting enable/disable information indicating that setting of the household electrical device 3 by the user is not received.

Further, the communication unit 11 is configured to transmit device identification information for specifying the household electrical device 3 and user identification information for specifying the user using the mobile device 1 along with a setting enable/disable request information request signal for requesting setting enable/disable information. Further, the communication unit 11 is configured to receive the setting enable/disable information indicating whether setting of the household electrical device 3 by the user is received, which is generated based on combination of the device identification information and the user identification information, and based on human detection information indicating whether there is a person in the vicinity of the household electrical device 3.

The communication unit 21 in the server 2 is configured to receive the human detection information transmitted by the communication unit 31 in the household electrical device 3. Further, the communication unit 21 is configured to receive the device identification information and the user identification information along with the setting enable/disable information request signal, and to receive the human detection information transmitted by the communication unit 31.

The control unit 22 in the server 2 is provided with a setting enable/disable information generation unit 221. The setting enable/disable information generation unit 221 is configured to generate setting enable/disable information indicating that setting of the household electrical device 3 by the user is received when the human detection information received by the communication unit 21 indicates that there is no person in the vicinity of the household electrical device 3, and to generate setting enable/disable information indicating that setting of the household electrical device 3 by the user is not received when the human detection information received by the communication unit 21 indicates that there is a person in the vicinity of the household electrical device 3. Further, the communication unit 21 is configured to transmit the setting enable/disable information generated by the setting enable/disable information generation unit 221 to the communication unit 11 in the mobile device 1.

The communication unit 11 in the mobile device 1 is configured to receive the setting enable/disable information transmitted by the communication unit 21. Further, the display control unit 131 in the mobile device 1 is configured to control the display unit 12 to display a setting input disable screen indicating that setting of the household electrical device 3 is not received without causing the display unit 12 to display a setting input screen when the communication unit 11 receives the setting enable/disable information indicating that setting of the household electrical device 3 by the user is not received.

The storage unit 23 in the server 2 is configured to store restriction information indicating whether a detection result included in the human detection information is to be validated or invalidated in association with the user identification information for each of the device identification information.

The setting enable/disable information generation unit 221 is configured to decide whether the detection result included in the human detection information received by the communication unit 21 is to be validated or invalidated by referring to the restriction information corresponding to the combination of the device identification information and the user identification information received by the communication unit 21, and to generate setting enable/disable information indicating that setting of the household electrical device 3 by the user is received when the detection result is invalidated.

Further, the human detection sensor 33 is configured to detect whether there is a person in the vicinity of the household electrical device 3, and to recognize whether the detected person is an adult or a child. The communication unit 31 is configured to transmit, to the server 2, human detection information indicating whether there is a person in the vicinity of the household electrical device 3, and adult detection information indicating whether the detected person is an adult.

The communication unit 21 in the server 2 is configured to receive the human detection information and the adult detection information transmitted by the communication unit 21. When the person detected by the human detection sensor 33 is recognized to be an adult, the setting enable/disable information generation unit 221 invalidates the detection result included in the human detection information received by the communication unit 21, and generates setting enable/disable information indicating that setting of the household electrical device 3 by the user is received.

Next, an operation to be performed by the communication system according to the second embodiment of the invention is described. FIG. 10 and FIG. 11 are a flowchart for describing an operation to be performed by the communication system according to the second embodiment of the invention.

The processes of Step S31 to Step S35 are substantially the same as the processes of Step S1 to Step S5 illustrated in FIG. 3, and accordingly, description thereof is omitted.

When it is judged that the household electrical device 3 is remote controlled, namely, when a selection item 122 for shifting the display screen to a setting input screen for allowing the user to input setting of the household electrical device 3 is selected (YES in Step S34), in Step S36, the communication unit 11 transmits, to the server 2, a setting enable/disable information request signal for requesting setting enable/disable information indicating whether setting of the household electrical device 3 by the user is received, device identification information for identifying the selected household electrical device, and user identification information for identifying the user using the mobile device 1. In transmitting a setting enable/disable information request signal, the communication unit 11 reads the device identification information corresponding to the selected household electrical device from the storage unit 15, and reads the user identification information from the storage unit 15 for transmitting the read device identification information and the read user identification information along with the setting enable/disable information request signal.

Subsequently, in Step S37, the communication unit 21 in the server 2 receives the human detection information request signal, the device identification information, and the user identification information transmitted by the communication unit 11.

Subsequently, in Step S38, the communication unit 21 transmits, to the household electrical device 3 to be specified by the received device identification information, a human detection information request signal for requesting human detection information indicating whether there is a person in the vicinity of the household electrical device 3.

Subsequently, in Step S39, the communication unit 31 in the household electrical device 3 receives the human detection information request signal transmitted by the communication unit 21.

Subsequently, in Step S40, the human detection sensor 33 acquires human detection information indicating whether there is a person in the vicinity of the household electrical device 3, and adult detection information indicating whether the detected person is an adult. The human detection sensor 33 detects whether there is a person in the vicinity of the household electrical device 3, and recognizes whether the detected person is an adult or a child in response to receiving a human detection information request signal. The human detection sensor 33 may periodically detect at a predetermined time interval. In this case, the human detection sensor 33 outputs a latest detection result and a latest recognition result to the communication unit 31 in response to receiving a human detection information request signal.

The human detection sensor 33 in the second embodiment not only detects the presence or absence of a person but also recognizes whether the detected person is an adult or a child. The human detection sensor 33 recognizes whether the detected person is an adult or a child, with use of a well-known face recognition technique. For instance, the human detection sensor 33 recognizes a person from an image photographed by a camera, and recognizes whether the recognized person is an adult or a child based on the face image of the person. The human detection sensor 33 may detect a pet (animal) such as a dog. In this case, the human detection sensor 33 recognizes that the detected pet (animal) is not an adult.

Subsequently, in Step S41, the communication unit 31 transmits, to the server 2, the human detection information and the adult detection information acquired by the human detection sensor 33.

Subsequently, in Step S42, the communication unit 21 in the server 2 receives the human detection information and the adult detection information transmitted by the communication unit 31.

Subsequently, in Step S43, the setting enable/disable information generation unit 221 generates setting enable/disable information indicating whether setting of the household electrical device 3 by the user is received by referring to a restriction information table stored in the storage unit 23, based on the human detection information received by the communication unit 21, and based on the adult detection information, the device identification information, and the user recognition information received by the communication unit 21.

In the same manner as in the first embodiment, the server 2 may transmit the human detection information request signal to receive the human detection information transmitted from the electrical device in response to the request signal, or may periodically receive the human detection information from the electrical device. The server 2 may periodically receive the adult detection information, as well as the human detection information.

FIG. 12 is a diagram illustrating an example of the restriction information table stored in the storage unit of the server in the second embodiment of the invention.

As illustrated in FIG. 12, the restriction information table records device identification information, user identification information, and restriction information indicating whether a human detection result is to be validated or invalidated in association with each other. The restriction information includes restriction information (human detection invalidation) for invalidating a human detection result when a person is detected, restriction information (human detection validation) of validating a human detection result when a person is detected, and restriction information (human detection validation and adult detection invalidation) of validating a human detection result when a person is detected and of invalidating a human detection result when an adult is detected.

For instance, the setting enable/disable information generation unit 221 invalidates a human detection result when the device identification information is "$ID_A$" and the user identification information is "$ID_1$" or "$ID_2$". In this case, the setting enable/disable information generation unit 221 generates setting enable/disable information indicating setting input by the user is received regardless of receiving human detection information indicating the presence of a person.

Further, the setting enable/disable information generation unit 221 validates a human detection result when the device identification information is "$ID_A$", and the user identification information is "$ID_3$", "$ID_4$", or "$ID_5$". In this case, the setting enable/disable information generation unit 221 generates setting enable/disable information indicating that setting input by the user is not received in response to receiving human detection information indicating the presence of a person.

Further, the setting enable/disable information generation unit 221 validates a human detection result when the device identification information is "$ID_A$", the user identification information is "$ID_3$" or "$ID_4$", and the adult detection information indicates that the person is not an adult (in other words, is a child). In this case, the setting enable/disable information generation unit 221 generates setting enable/disable information indicating that setting input by the user is received in response to receiving human detection information indicating the presence of a person and adult detection information indicating that the detected person is an adult. Further, the setting enable/disable information generation unit 221 generates setting enable/disable information indicating that setting input by the user is not received in response to receiving human detection information indicating the presence of a person and adult detection information indicating that the detected person is not an adult.

Furthermore, the setting enable/disable information generation unit 221 invalidates a human detection result when the device identification information is "$ID_A$", the user identification information is "$ID_3$" or "$ID_4$", and the adult detection information indicates that the person is an adult. In this case, the setting enable/disable information generation unit 221 generates setting enable/disable information indicating that setting input by the user is received in response to receiving human detection information indicating the presence of a person and adult detection information indicating that the detected person is an adult.

Subsequently, in Step S44, the communication unit 21 transmits the setting enable/disable information generated by the setting enable/disable information generation unit 221 to the mobile device 1.

Subsequently, in Step S45, the communication unit 11 in the mobile device 1 receives the setting enable/disable information transmitted by the communication unit 21.

Subsequently, in Step S46, the display control unit 131 judges whether setting input by the user is received, namely, whether setting enable/disable information indicating setting input by the user is received has been received. When it is judged that setting input by the user is not received (NO in Step S46), in Step S47, the display control unit 131 controls the display unit 12 to display a setting input disable screen indicating that setting of the household electrical device 3 is not received without causing the display unit 12 to display a setting input screen. Since the setting input disable screen has been described in the first embodiment, description thereof is omitted.

On the other hand, when it is judged that setting input by the user is received (YES in Step S46), in Step S48, the display control unit 131 controls the display unit 12 to display a setting input screen. Since the setting input screen has been described in the first embodiment, description thereof is omitted.

The processes of Step S49 to Step S54 are substantially the same as the processes of Step S18 to Step S23 illustrated in FIG. 4, and accordingly, description thereof is omitted.

As described above, it is possible to decide whether a setting input screen or a setting input disable screen is to be displayed, with use of setting enable/disable information indicating that setting of the household electrical device 3 by the user is received when there is no person in the vicinity of the household electrical device 3, and indicating that setting of the household electrical device 3 by the user is not received when there is a person in the vicinity of the household electrical device 3.

In the second embodiment, the setting enable/disable information generation unit 221 is configured to generate setting enable/disable information based on human detection information, adult detection information, device identification information, and user recognition information. The invention is not specifically limited to the above. The setting enable/disable information generation unit 221 may be configured to generate setting enable/disable information based on only human detection information. Further alternatively, the setting enable/disable information generation unit 221 may be configured to generate setting enable/disable information based on human detection information, device identification information, and user recognition information.

The foregoing embodiments mainly include the invention having the following features.

A communication system according to an aspect of the invention is provided with an electrical device, a communication device which remote controls the electrical device, a server communicatively connected to the electrical device and to the communication device, and a human detection sensor which detects whether there is a person in the vicinity of the electrical device. The communication device includes a first communication unit which communicates with the server via wireless communication, a display unit, and a display control unit which controls the display unit to display a setting input screen for allowing a user to input setting of the electrical device. The server includes a second communication unit which communicates with the communication device and with the electrical device. The electrical device includes a third communication unit which communicates with the server. The first communication unit is configured to transmit to the server a request signal for checking whether there is a person in the vicinity of the electrical device before the setting input screen is displayed by the display control unit. The second communication unit is configured to receive the request signal transmitted by the first communication unit, and to transmit the received request signal to the electrical device. The third communication unit is configured to receive the request signal transmitted by the second communication unit, and to acquire human detection information indicating whether there is a person in the vicinity of the electrical device from the human detection sensor for transmission to the server. The display control unit is configured to control the display unit to display a setting input disable screen indicating that setting of the electrical device is not received without causing the display unit to display the setting input screen when there is a person in the vicinity of the electrical device.

According to the above configuration, the first communication unit of the communication device communicates with the server via wireless communication. The display control unit of the communication device controls the display unit to display a setting input screen for allowing the user to input setting of the electrical device. The second communication unit of the server communicates with the communication device and with the electrical device. The third communication unit of the electrical device communicates with the server. The first communication unit transmits to the server a request signal for checking whether there is a person in the vicinity of the electrical device before the setting input screen is displayed by the display control unit. The second communication unit receives the request signal transmitted by the first communication unit, and transmits the received request signal to the electrical device. The third communication unit receives the request signal transmitted by the second communication unit, and acquires human detection information indicating whether there is a person in the vicinity of the electrical device from the human detection sensor for transmission to the server. The display control unit controls the display unit to display a setting input disable screen indicating that setting of the electrical device is not received without causing the display unit to display the setting input screen when there is a person in the vicinity of the electrical device.

In the above configuration, a request signal for checking whether there is a person in the vicinity of the electrical device is transmitted before a setting input screen is displayed. When there is a person in the vicinity of the electrical device, a setting input disable screen indicating that setting of the electrical device is not received is displayed on the display unit without displaying the setting input screen on the display unit. This allows for the user to know that setting of the electrical device is not received because there is a person in the vicinity of the electrical device before the user inputs setting of the electrical device. This is advantageous in enhancing the user's operability. Further, when there is a person in the vicinity of the electrical device, setting input information for inputting setting of the electrical device is not transmitted from the communication device to the electrical device. This is advantageous in suppressing an increase in communications traffic on the network.

Further, in the communication system, preferably, the second communication unit may be configured to receive the human detection information transmitted by the third communication unit, and to transmit the received human detection information to the communication device. The first communication unit may be configured to receive the human detection information transmitted by the second communication unit. The display control unit may be configured to control the display unit to display the setting input disable screen without causing the display unit to display the setting input screen when the human detection information indicating the presence of a person is received by the first communication unit.

According to the above configuration, the second communication unit receives the human detection information transmitted by the third communication unit, and transmits the received human detection information to the communication device. The first communication unit receives the human detection information transmitted by the second communication unit. The display control unit controls the display unit to display the setting input disable screen without causing the display unit to display the setting input screen when the human detection information indicating the presence of a person is received by the first communication unit.

The above configuration makes it possible to decide whether a setting input screen or a setting input disable screen is to be displayed, with use of human detection information indicating the presence or absence of a person.

Further, in the communication system, preferably, the second communication unit may be configured to receive the human detection information transmitted by the third communication unit. The server may further include a setting enable/disable information generation unit which generates setting enable/disable information indicating that setting of the electrical device by the user is received when the human detection information received by the second communication unit indicates the absence of a person in the vicinity of the electrical device, and generates setting enable/disable information indicating that setting of the electrical device by the user is not received when the human detection information received by the second communication unit indicates the presence of a person in the vicinity of the electrical device. The second communication unit may be configured to transmit the setting enable/disable information generated by the setting enable/disable information generation unit to the communication device. The first communication unit may be configured to receive the setting enable/disable information transmitted by the second communication unit. The display control unit may be configured to control the display unit to display the setting input disable screen without causing the display unit to display the setting input screen when the first communication unit receives the setting enable/disable information indicating that setting of the electrical device by the user is not received.

According to the above configuration, the second communication unit receives the human detection information transmitted by the third communication unit. The setting enable/disable information generation unit of the server generates setting enable/disable information indicating that setting of the electrical device by the user is received when the human detection information indicates the absence of a person in the vicinity of the electrical device, and generates setting enable/disable information indicating that setting of the electrical device by the user is not received when the human detection information indicates the presence of a person in the vicinity of the electrical device. The second communication unit transmits the setting enable/disable information generated by the setting enable/disable information generation unit to the communication device. The first communication unit of the communication device receives the setting enable/disable information transmitted by the second communication unit. The display control unit controls the display unit to display the setting input disable screen without causing the display unit to display the setting input screen when the setting enable/disable information indicating that setting of the electrical device by the user is not received.

The above configuration makes it possible to decide whether a setting input screen or a setting input disable screen is to be displayed, with use of setting enable/disable information indicating that setting of the electrical device by the user is received when there is no person in the vicinity of the electrical device, and indicating that setting of the electrical device by the user is not received when there is a person in the vicinity of the electrical device.

Further, in the communication system, preferably, the first communication unit may be configured to transmit electrical device identification information for specifying the electrical device and user identification information for specifying the user using the communication device along with the request signal. The second communication unit may be configured to receive the electrical device identification information and the user identification information along with the request signal, and to receive the human detection information transmitted by the third communication unit.

The server may further include a storage unit which stores restriction information indicating whether a detection result included in the human detection information is to be validated or invalidated in association with the user identification information for each of the electrical device identification information. The setting enable/disable information generation unit may be configured to decide whether a detection result included in the human detection information received by the second communication unit is to be validated or invalidated by referring to the restriction information corresponding to combination of the electrical device identification information and the user identification information received by the second communication unit, and to generate setting enable/disable information indicating that setting of the electrical device by the user is received when the detection result is invalidated.

According to the above configuration, the first communication unit transmits electrical device identification information for specifying the electrical device and user identification information for specifying the user using the communication device along with the request signal. The second communication unit receives the electrical device identification information and the user identification information along with the request signal, and receives the human detection information transmitted by the third communication unit. The storage unit of the server stores restriction information indicating whether a detection result included in the human detection information is to be validated or invalidated in association with the user identification information for each of the electrical device identification information. The setting enable/disable information generation unit decides whether a detection result included in the human detection information is to be validated or invalidated by referring to the restriction information corresponding to combination of the electrical device identification information and the user identification information, and generates setting enable/disable information indicating that setting of the electrical device by the user is received when the detection result is invalidated.

The above configuration makes it possible to decide whether setting of the electrical device is to be received for each user, taking into consideration a combination of the electrical device identification information and the user identification information, in addition to a determination as to whether there is a person in the vicinity of the electrical device.

Further, in the communication system, preferably, the human detection sensor may be configured to recognize whether the detected person is an adult or a child, and the setting enable/disable information generation unit may be configured to invalidate a detection result included in the human detection information received by the second communication unit, and to generate setting enable/disable information indicating that setting of the electrical device by the user is received when the person detected by the human detection sensor is recognized to be an adult.

According to the above configuration, the human detection sensor recognizes whether the detected person is an adult or a child. The setting enable/disable information generation unit invalidates a detection result included in the human detection information, and generates setting enable/disable information indicating that setting of the electrical device by the user is received when the person detected by the human detection sensor is recognized to be an adult.

The above configuration makes it possible to decide whether setting of the electrical device is received, taking into consideration whether the detected person is an adult or a child, in addition to a determination as to whether there is a person in the vicinity of the electrical device. In particular, the above configuration is advantageous in allowing the user to input setting of the electrical device when there is an adult in the vicinity of the electrical device.

Further, in the communication system, preferably, the electrical device may be internally provided with the human detection sensor.

According to the above configuration, the electrical device is internally provided with the human detection sensor. Accordingly, it is easy to detect whether there is a person in the vicinity of the electrical device.

A communication device according to another aspect of the invention is a communication device for remote controlling an electrical device. The communication device is provided with a communication unit which performs communication via wireless communication; a display unit, and a display control unit which controls the display unit to display a setting input screen for allowing a user to input setting of the electrical device. The communication unit is configured to transmit a request signal for checking whether there is a person in the vicinity of the electrical device before the setting input screen is displayed by the display control unit. The display control unit is configured to control the display unit to display a setting input disable screen indicating that setting of the electrical device is not received without causing the display unit to display the setting input screen when there is a person in the vicinity of the electrical device.

According to the above configuration, the communication unit performs communication via wireless communication. The display control unit controls the display unit to display a setting input screen for allowing a user to input setting of the electrical device. The communication unit transmits a request signal for checking whether there is a person in the vicinity of the electrical device before the setting input screen is displayed by the display control unit. The display control unit controls the display unit to display a setting input disable screen indicating that setting of the electrical device is not received without causing the display unit to display the setting input screen when there is a person in the vicinity of the electrical device.

In the above configuration, a request signal for checking whether there is a person in the vicinity of the electrical device is transmitted before a setting input screen is displayed. When there is a person in the vicinity of the electrical device, a setting input disable screen indicating that setting of the electrical device is not received is displayed on the display unit without displaying the setting input screen on the display unit. This allows for the user to know that setting of the electrical device is not received because there is a person in the vicinity of the electrical device before the user inputs setting of the electrical device. This is advantageous in enhancing the user's operability. Further, when there is a person in the vicinity of the electrical device, setting input information for inputting setting of the electrical device is not transmitted from the communication device to the electrical device. This is advantageous in suppressing an increase in communications traffic on the network.

Further, in the communication device, preferably, the display control unit may be configured to control the display unit to display a menu screen including items for shifting to the setting input screen, and the setting input screen. The communication unit may be configured to transmit the request signal when a display screen is switched from the menu screen to the setting input screen by the display control unit.

According to the above configuration, the display control unit controls the display unit to display the menu screen including items for shifting to the setting input screen, and the setting input screen. The communication unit transmits the request signal when the display screen is switched from the menu screen to the setting input screen by the display control unit.

In the above configuration, a request signal is transmitted when the display screen is switched from the menu screen including items for shifting to a setting input screen to the setting input screen. This allows for the user to check whether there is a person in the vicinity of the electrical device before the setting input screen is displayed.

Further, in the communication device, preferably, the display control unit may be configured to control the display unit to display a menu screen including items for shifting to the setting input screen, and may be configured to control the display unit to display the setting input disable screen before the setting input screen is displayed on the display unit when there is a person in the vicinity of the electrical device.

According to the above configuration, the menu screen including items for shifting to the setting input screen is displayed on the display unit. When there is a person in the vicinity of the electrical device, the setting input disable screen is displayed on the display unit before the setting input screen is displayed on the display unit.

As described above, the setting input disable screen is displayed after the menu screen is displayed and before the setting input screen is displayed. This allows for the user to check whether there is a person in the vicinity of the electrical device before the setting input screen is displayed.

Further, in the communication device, preferably, the communication unit may be configured to receive human detection information indicating whether there is a person in the vicinity of the electrical device before the setting input screen is displayed by the display control unit. The display control unit may be configured to control the display unit to display the setting input disable screen without causing the display unit to display the setting input screen when the communication unit receives the human detection information indicating the presence of a person.

According to the above configuration, human detection information indicating whether there is a person in the vicinity of the electrical device is received before the setting input screen is displayed by the display control unit. When human detection information indicating the presence of a person is received, the setting input disable screen is displayed on the display unit without displaying the setting input screen on the display unit.

The above configuration makes it possible to decide whether a setting input screen or a setting input disable screen is to be displayed, with use of human detection information indicating the presence or absence of a person.

Further, in the communication device, preferably, the communication unit may be configured to receive setting enable/disable information indicating that setting of the electrical device by the user is received when there is no person in the vicinity of the electrical device, and indicating that setting of the electrical device by the user is not received when there is a person in the vicinity of the electrical device before the setting input screen is displayed by the display control unit. The display control unit may be configured to control the display unit to display the setting input disable screen without causing the display unit to display the setting input screen when the communication unit receives the setting enable/disable information indicating that setting of the electrical device by the user is not received.

According to the above configuration, there is received the setting enable/disable information indicating that setting of the electrical device by the user is received when there is no person in the vicinity of the electrical device, and indicating that setting of the electrical device by the user is not received when there is a person in the vicinity of the electrical device before the setting input screen is displayed by the display control unit. The setting input disable screen is displayed on the display unit without displaying the setting input screen on the display unit when the setting enable/disable information indicating that setting of the electrical device by the user is not received is received.

The above configuration makes it possible to decide whether a setting input screen or a setting input disable screen is to be displayed, with use of setting enable/disable information indicating that setting of the electrical device by the user is received when there is no person in the vicinity of the electrical device, and indicating that setting of the electrical device by the user is not received when there is a person in the vicinity of the electrical device.

Further, in the communication device, preferably, the communication unit may be operative to transmit electrical device identification information for specifying the electrical device and user identification information for specifying the user using the communication device along with the request signal, and to receive setting enable/disable information indicating whether setting of the electrical device by the user is received, the setting enable/disable information being generated based on combination of the electrical device identification information and the user identification information, and based on human detection information indicating whether there is a person in the vicinity of the electrical device.

According to the above configuration, the electrical device identification information for specifying the electrical device and the user identification information for specifying the user using the communication device are transmitted along with the request signal. Then, there is received the setting enable/disable information indicating whether setting of the electrical device by the user is received. The setting enable/disable information is generated based on combination of the electrical device identification information and the user identification information, and based on human detection information indicating whether there is a person in the vicinity of the electrical device.

The above configuration makes it possible to decide whether setting of the electrical device is to be received for each user, taking into consideration combination of the electrical device identification information and the user identification information, in addition to a determination as to whether there is a person in the vicinity of the electrical device.

A communication method according to yet another aspect of the invention is a communication device for remote controlling an electrical device. The communication method includes a request signal transmitting step of transmitting a request signal for checking whether there is a person in the vicinity of the electrical device before the setting input screen for allowing a user to input setting of the electrical device is displayed, and a display step of displaying on a display unit a setting input disable screen indicating that setting of the electrical device is not received without causing the display unit to display the setting input screen when there is a person in the vicinity of the electrical device.

According to the above configuration, in the request signal transmitting step, a request signal for checking whether there is a person in the vicinity of the electrical device is transmitted before the setting input screen for allowing the user to input setting of the electrical device is displayed. In the display step, the setting input disable screen indicating that setting of the electrical device is not received is displayed on the display unit without displaying the setting input screen on the display unit when there is a person in the vicinity of the electrical device.

As described above, a request signal for checking whether there is a person in the vicinity of the electrical device is transmitted before a setting input screen is displayed. When there is a person in the vicinity of the electrical device, a setting input disable screen indicating that setting of the electrical device is not received is displayed on the display unit without displaying the setting input screen on the display unit. This allows for the user to know that setting of the electrical device is not received because there is a person in the vicinity of the electrical device before the user inputs setting of the electrical device. This is advantageous in enhancing the user's operability. Further, when there is a person in the vicinity of the electrical device, setting input information for inputting setting of the electrical device is not transmitted from the communication device to the electrical device. This is advantageous in suppressing an increase in communications traffic on the network.

The embodiments or the examples described in the description of embodiments are provided to clarify the technical contents of the invention. The invention should not be construed to be limited to the embodiments or the examples. The invention may be modified in various ways as far as such modifications do not depart from the spirit and the scope of the invention hereinafter defined.

INDUSTRIAL APPLICABILITY

The remote controlling method, the communication device, and the computer-readable storage medium recorded with a computer program for performing remote control of the invention are useful as a remote controlling method, a communication device, and a computer-readable storage medium recorded with a computer program for performing remote control capable of enhancing the user's operability for remote controlling an electrical device.

What is claimed is:

1. A remote controlling method for remote controlling an electrical device using a communication device, comprising:
   a receiving step of receiving, from the electrical device, presence/absence information indicating whether there is a person in the vicinity of the electrical device before a first screen for allowing a user to input setting of the electrical device is displayed; and
   a providing step of providing a display unit in the communication device with a second screen indicating that input of setting of the electrical device via the communication device by a user is not able to be entered when there is a person in the vicinity of the electrical device, based on the received presence/absence information.

2. The remote controlling method according to claim 1, wherein
   in the providing step, the first screen is provided to the display unit when there is no person in the vicinity of the electrical device, based on the received presence/absence information.

3. The remote controlling method according to claim 1, wherein
the presence/absence information is transmitted from the electrical device in response to a signal for requesting the presence/absence information.

4. The remote controlling method according to claim 1, further comprising:
a correcting step of correcting the received presence/absence information in accordance with user identification information for identifying the user using the communication device.

5. A communication device for remote controlling an electrical device, comprising:
a display unit;
a communication unit which receives presence/absence information indicating whether there is a person in the vicinity of the electrical device via wireless communication before a first screen for allowing a user to input setting of the electrical device is displayed on the display unit; and
a control unit which controls the display unit to display a second screen indicating that input of setting of the electrical device via the communication device by a user is not able to be entered when there is a person in the vicinity of the electrical device, based on the received presence/absence information.

6. The communication device according to claim 5, wherein
the control unit controls the display unit to display the first screen when there is no person in the vicinity of the electrical device, based on the received presence/absence information.

7. The communication device according to claim 5, wherein
the presence/absence information is transmitted from the electrical device in response to a signal for requesting the presence/absence information.

8. The communication device according to claim 5, wherein
the communication unit transmits a signal for requesting the presence/absence information, and receives the presence/absence information to be transmitted from the electrical device in response to the signal for requesting the presence/absence information.

9. The communication device according to claim 5, wherein
the presence/absence information to be received by the communication unit is corrected based on user identification information for identifying the user using the communication device.

10. A non-transitory computer-readable storage medium recorded with a computer program for remote controlling an electrical device using a communication device, the computer program causing a computer to execute:
a receiving step of receiving presence/absence information indicating whether there is a person in the vicinity of the electrical device via wireless communication before a first screen for allowing a user to input setting of the electrical device is displayed on a display unit; and
a controlling step of controlling the display unit to display a second screen indicating that input of setting of the electrical device via the communication device by a user is not able to be entered when there is a person in the vicinity of the electrical device, based on the received presence/absence information.

* * * * *